United States Patent
Chu

(10) Patent No.: US 7,456,511 B1
(45) Date of Patent: Nov. 25, 2008

(54) WIND POWERED GLOBAL POSITIONING TRACKING DEVICE

(76) Inventor: Charles Chu, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/882,075

(22) Filed: Jul. 30, 2007

(30) Foreign Application Priority Data

Jun. 15, 2007 (TW) ............................... 96209874 U

(51) Int. Cl.
*F03D 9/00* (2006.01)
*H02P 9/00* (2006.01)

(52) U.S. Cl. ...................................... 290/44; 455/456.1

(58) Field of Classification Search .................. 290/44; 455/456.1

See application file for complete search history.

(56) References Cited

U.S. PATENT DOCUMENTS

| | | | |
|---|---|---|---|
| 5,746,283 A * | 5/1998 | Brighton | 180/65.3 |
| 5,884,199 A * | 3/1999 | Maki | 455/575.1 |
| 5,920,127 A * | 7/1999 | Damron et al. | 290/44 |
| 6,169,497 B1 * | 1/2001 | Robert | 340/988 |
| 6,897,575 B1 * | 5/2005 | Yu | 290/44 |
| 7,211,905 B1 * | 5/2007 | McDavid, Jr. | 290/44 |
| 2003/0057708 A1 * | 3/2003 | Wu | 290/55 |
| 2004/0030496 A1 * | 2/2004 | Brodie | 701/213 |
| 2005/0288039 A1 * | 12/2005 | Liou | 455/456.6 |
| 2006/0237239 A1 * | 10/2006 | Bruner et al. | 180/6.7 |
| 2007/0051292 A1 * | 3/2007 | Kilbourn et al. | 114/311 |
| 2007/0152448 A1 * | 7/2007 | Goldman et al. | 290/1 R |

FOREIGN PATENT DOCUMENTS

JP 2001115945 A * 4/2001

* cited by examiner

*Primary Examiner*—Joseph Waks
(74) *Attorney, Agent, or Firm*—Troxell Law Office, PLLC

(57) ABSTRACT

A wind powered global positioning tracking device, which is disposed on a vehicle, and includes a wind driven generator, a power regulating circuit, a central processing unit, a charging circuit, a rechargeable battery, a general packet radio service module and a global positioning system receiver module. When in use, the power regulating circuit converts electricity generated by the wind driven generator to provide electric energy to the central processing unit, the general packet radio service module and the global positioning system receiver module. Furthermore, the electric energy is input into the charging circuit to charge the rechargeable battery. Accordingly, when there is no wind for the wind driven generator to generate electricity, the charging circuit can be placed in an electric discharge state controlled by the central processing unit, thereby enabling the rechargeable battery to continue supplying electric energy, thus ensuring normal operation of the global positioning tracking device.

5 Claims, 3 Drawing Sheets

WIND POWERED GLOBAL POSITIONING TRACKING DEVICE

BACKGROUND OF THE INVENTION (a) Field of the Invention

The present invention relates to a wind powered global positioning tracking device, and more particularly to a global positioning tracking device that uses wind power to generate electricity and supply the device with electric power.

(b) Description of the Prior Art

A conventional GPS (global positioning system) tracking device is a device that relies on 24 satellites orbiting 20,000 kilometers above the earth for determining time and position on the earth. Each of the satellites carry two cesium atomic clocks and two rubidium atomic clocks, which are able to provide GPS equipment receiving the satellite signals with accurate longitude and latitude numerical values, thereby a user is capable to be acknowledged his present location anywhere in the world.

However, the conventional global positioning tracking device uses batteries (for example: rechargeable batteries) to provide electric power, resulting in the batteries only being able to provide electric power for a period of time. Hence, if the conventional global positioning tracking device is used for a long period of time outdoors, or the user has no new batteries to replace the old ones, then it easily results in the global positioning tracking device being unusable due to lack of electric power, which is extremely inconvenient to the user.

SUMMARY OF THE INVENTION

Hence, in light of the shortcomings of the aforementioned prior art, the inventor of the present invention, having accumulated knowhow and manufacturing experience of various global positioning tracking devices, attentively researched various methods to resolve such drawbacks, which, following continuous research and improvements, culminated in the design of a completely new wind powered global positioning tracking device of the present invention.

The primary objective of the present invention is to provide a wind powered global positioning tracking device that uses wind power to generate electricity and supply the device with electric power.

According to the aforementioned objective, the global positioning tracking device of the present invention is configured with a main body, wherein the main body comprises a wind driven generator, a power regulating circuit, a central processing unit (CPU), a charging circuit, a rechargeable battery, a general packet radio service (GPRS) module and a global positioning system (GPS) receiver module. The wind driven generator is connected to both the power regulating circuit and the charging circuit, and the power regulating circuit is connected to the central processing unit. The central processing unit is respectively connected to the general packet radio service (GPRS) module, the global positioning system (GPS) receiver module and the charging circuit. The charging circuit is connected to the rechargeable battery. The wind driven generator is disposed in a vehicle, and wind power produced while the vehicle is moving forward is used to generate electricity. Hence, when in use, the power regulating circuit is used to convert electric power produced by the wind driven generator and provide normal working electric energy to the central processing unit, the general packet radio service (GPRS) module and the global positioning system (GPS) receiver module, at the same time, the electric energy is input to the charging circuit, thereby enabling the charging circuit to implement charging of the rechargeable battery. Accordingly, when there is no wind for the wind driven generator to generate electricity, the charging circuit is placed in an electric discharge state under the control of the central processing unit, thereby enabling the rechargeable battery to continue in supplying electric energy to the general packet radio service (GPRS) module and the global positioning system (GPS) receiver module, thereby ensuring normal operation of the global positioning tracking device.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
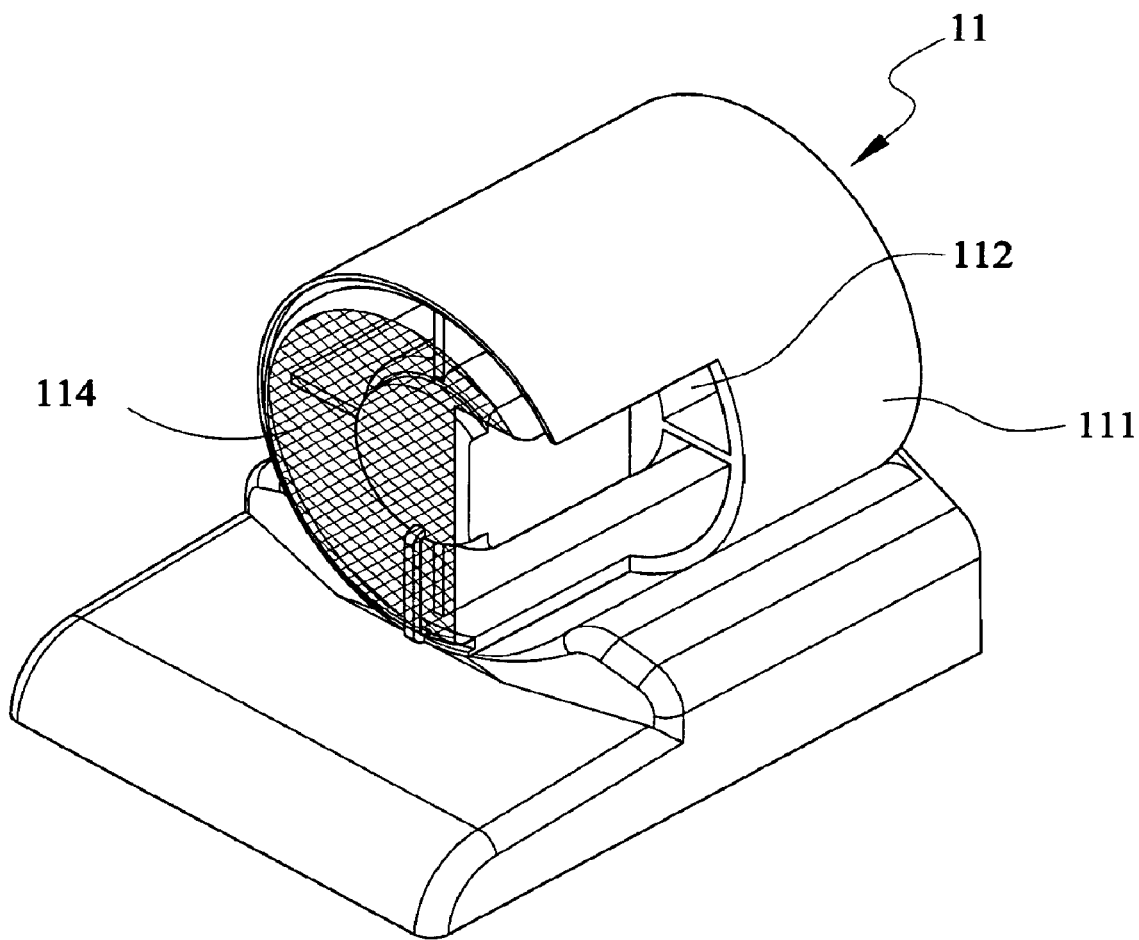
FIG. 1 shows an elevational view depicting an external appearance of a wind powered global positioning tracking device of the present invention.
Figure 2:
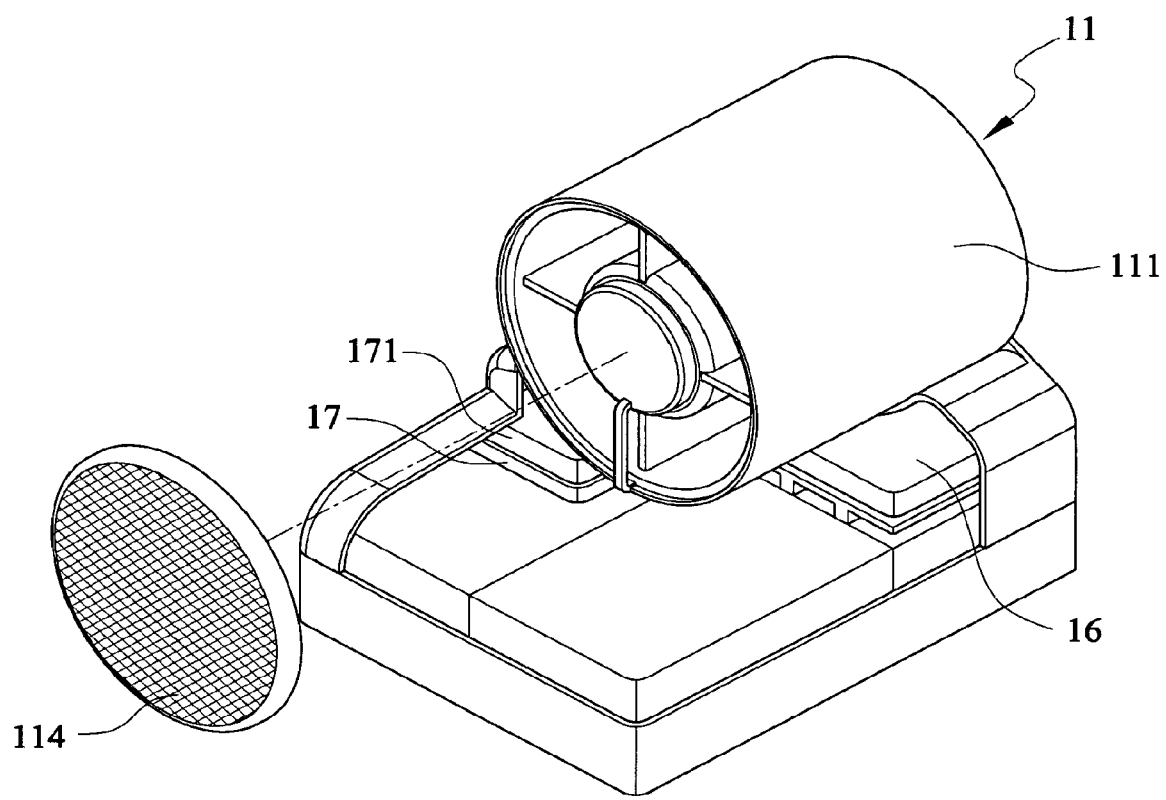
FIG. 2 shows an exploded elevational view of the wind powered global positioning tracking device of the present invention.
Figure 3:
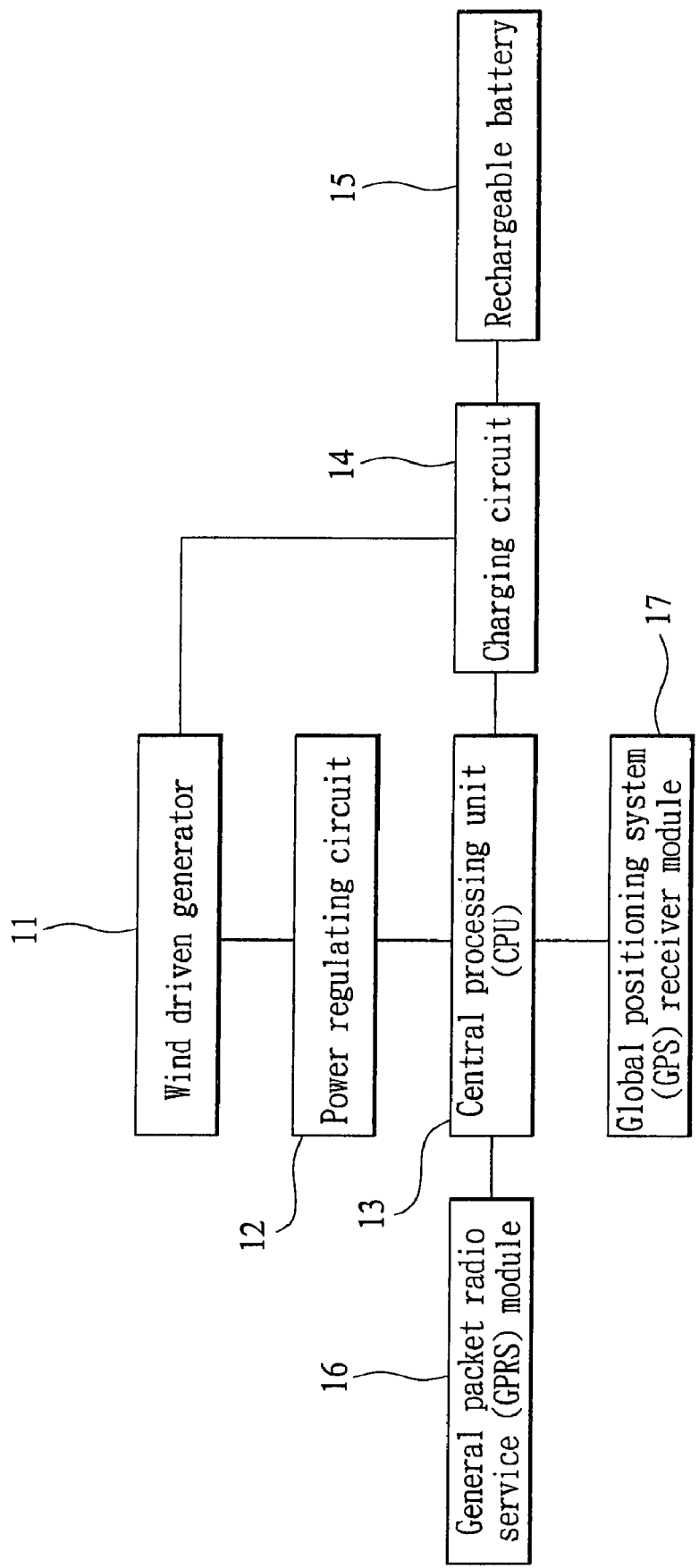
FIG. 3 shows a block diagram of the wind powered global positioning tracking device of the present invention.

The present invention provides a wind powered global positioning tracking device, as depicted in FIGS. 1, 2 and 3, wherein the global positioning tracking device of the present invention is configured with a main body 10 which comprises a wind driven generator 11, a power regulating circuit 12, a central processing unit (CPU) 13, a charging circuit 14, a rechargeable battery 15, a general packet radio service (GPRS) module 16 and a global positioning system (GPS) receiver module 17. The wind driven generator 11 is connected to both the power regulating circuit 12 and the charging circuit 14, and the power regulating circuit 12 is connected to the central processing unit 13. The central processing unit 13 is respectively connected to the general packet radio service (GPRS) module 16, the global positioning system (GPS) receiver module 17 and the charging circuit 14. Moreover, the charging circuit 14 is connected to the rechargeable battery 15. The wind driven generator 11 is disposed in a vehicle (for example: a train, a ship or an automobile), and wind power produced while the vehicle is moving forward is used to generate electricity.

According to the aforementioned assembly of component members, when in use, the power regulating circuit 12 is used to convert electric power produced by the wind driven generator 11 and provide normal working electric energy to the central processing unit 13, the general packet radio service (GPRS) module 16 and the global positioning system (GPS) receiver module 17. Furthermore, the electric energy is input to the charging circuit 14, thereby enabling the charging circuit 14 to implement charging to the rechargeable battery 15. Accordingly, when the vehicle stops traveling and is placed in a stationary state, and thus providing no wind for the wind driven generator 11 to generate electricity, then the charging circuit 14 is placed in an electric discharge state under the control of the central processing unit 13, which thereby enabling the rechargeable battery 15 to continue in supplying electric energy to the general packet radio service (GPRS) module 16 and the global positioning system (GPS) receiver module 17, thus ensure normal operation of the global positioning tracking device.

Referring again to FIGS. 1, 2 and 3, the rechargeable battery 15 can be a large capacity rechargeable battery. Under control of the charging circuit 14, charging of the rechargeable battery 15 continues while electric quantity has not been fully restored to the rechargeable battery 15, After electric quantity of the rechargeable battery 15 is fully restored, then charging is automatically stopped, thereby maintaining the rechargeable battery 15 in a fully charged state. Temperature range of the working environment of the rechargeable battery 15 is between −40 degrees and 70 degrees, and is thus suitable for use in an outside working environment. Moreover, service life of the rechargeable battery 15 is long, extending to 5 years, and electric capacity is sufficient to supply electricity for continuous normal working of the global positioning system (GPS) receiver module 17 for more than 7 days, thereby basically satisfying the normal working power requirements for the vehicle when stationary and undergoing maintenance. Furthermore, interior of the device is provided with a new charging and discharging control circuit, which protects the battery from damage resulting from overcharge or overdischarge.

Referring again to FIGS. 1, 2 and 3, the wind driven generator 11 is provided with a housing 111, the interior of which is provided with a wind wheel 112. The wind wheel 112 is connected to a generator (not shown in the drawings), thereby enabling wind (flowing air) to drive and rotate the wind wheel 112, from which electricity is generated. A protective net 114 is located on a wind inlet and a wind outlet of the wind wheel 112 of the housing 111, thereby preventing extraneous material from entering the housing 111, and thus protecting the wind wheel 112 and the generator.

Referring again to FIGS. 1, 2 and 3, the wind wheel 112 of the wind driven generator 11 enables the generator to generate a rated voltage output of 24V with an average current of 315 mA under 1080 L/min airflow speed conditions. The generator can produce a voltage ranging between 9V and 30V, with a minimum airflow speed of 750 L/min being required to produce 9V. Accordingly, the wind driven generator 11 has a low starting wind power and high use effectiveness. Furthermore, the entire wind driven generator 11 is made of aluminum material, and mean time to failure for the generator is 40,000 hours, which provides the wind driven generator 11 with a long working life. The wind inlet and wind outlet of an orientation mechanism are respectively provided with the protective nets 114 to shield extraneous material from impacting the generator, and which also ensure maximum wind power from wind energy, thereby rendering certain that the wind driven generator 11 is not subjected to disturbance and damage from outside extraneous material during movement.

Referring again to FIGS. 1, 2 and 3, the global positioning system (GPS) receiver module 17 interior of the global positioning tracking device comprises a GPS receiving antenna 117, thereby ensuring the global positioning system (GPS) receiver module 17 is able to receive difference in signals at any random orientation and under conditions of high speed movement, and quickly and accurately locate position of the vehicle. The frequency module adopted by the general packet radio service (GPRS) module 16 to transmit the position location report is an industrial grade 4 frequency module, which can be used globally.

Referring again to FIGS. 1, 2 and 3, the wind powered global positioning tracking device of the present invention adopts a general design, external appearance conforms to aerodynamic requirements, and is completely waterproof. The entire structural design is firm and durable, and can withstand the impact from extraneous material, including broken stones, and the like, thereby completely meeting the requirements for outdoor use. Installment of the device is simple, and eliminates the need for any connecting wires; the only requirements are that the device be fixedly secured, and that the power supply adopts wind energy electric power generation, thereby protecting the environment and providing practicability.

In conclusion, the wind powered global positioning tracking device of the present invention is assuredly provided with an Innovative structure not found in prior art. Moreover, products having a similar structure to that of the present invention have not been seen in any publication or in the market, thus the present invention is provided with undoubted originality. In addition, the present invention is provided with unique characteristics and functionality that are without comparison in prior art. Hence, the incomparable advancement of the present invention clearly complies with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A wind powered global positioning tracking device, configured with a main body, wherein the main body comprises a wind driven generator, a power regulating circuit, a central processing unit (CPU), a charging circuit, a rechargeable battery, a general packet radio service (GPRS) module and a global positioning system (GPS) receiver module; the wind driven generator is connected to both the power regulating circuit and the charging circuit, and the power regulating circuit is connected to the central processing unit; the central processing unit is respectively connected to the general packet radio service (GPRS) module, the global positioning system (GPS) receiver module and the charging circuit; the charging circuit is connected to the rechargeable battery; the wind driven generator is disposed in a vehicle, and wind power produced while the vehicle is moving forward is used to generate electricity; the power regulating circuit is used to convert electric power produced by the wind driven generator and provide electric energy to the central processing unit, the general packet radio service (GPRS) module and the global positioning system (GPS) receiver module, at the same time the electric energy is input to the charging circuit, thereby enabling the charging circuit to implement charging to the rechargeable battery; when there is no wind for the wind driven generator to generate electricity, then the charging circuit is placed in an electric discharge state under control of the central processing unit, thereby enabling the rechargeable battery to continue in supplying electric energy to the general packet radio service (GPRS) module and the global positioning system (GPS) receiver module, and thus ensure normal operation of the global positioning tracking device.

2. The wind powered global positioning tracking device according to claim 1, wherein the rechargeable battery is a large capacity rechargeable battery, and, under the control of the charging circuit, charging of the rechargeable battery continues while electric quantity has not been fully restored to the rechargeable battery, and when electric quantity of the rechargeable battery is fully restored, then charging is automatically stopped, thereby protecting the battery from damage resulting from overcharge or overdischarge.

3. The wind powered global positioning tracking device according to claim 1, wherein the wind driven generator is provided with a housing, interior of which is provided with a wind wheel; the wind wheel is connected to a generator, thereby enabling wind (flowing air) to drive and rotate the wind wheel and generate electricity.

4. The wind powered global positioning tracking device according to claim 3, wherein a protective net is located on a wind inlet and a wind outlet of the wind wheel of the housing, thereby preventing extraneous material from entering the housing, and thus protecting the wind wheel and the generator.

5. The wind powered global positioning tracking device according to claim 1, wherein the global positioning system (GPS) receiver module comprises a GPS receiving antenna, thereby ensuring the global positioning system (GPS) receiver module to receive difference in signals at any random orientation and under conditions of high speed movement, and quickly and accurately locate position of the vehicle.

* * * * *